(No Model.)
F. PRINZ.
Machine for Separating Foreign Matter from Grain, &c.
No. 234,724. Patented Nov. 23, 1880.
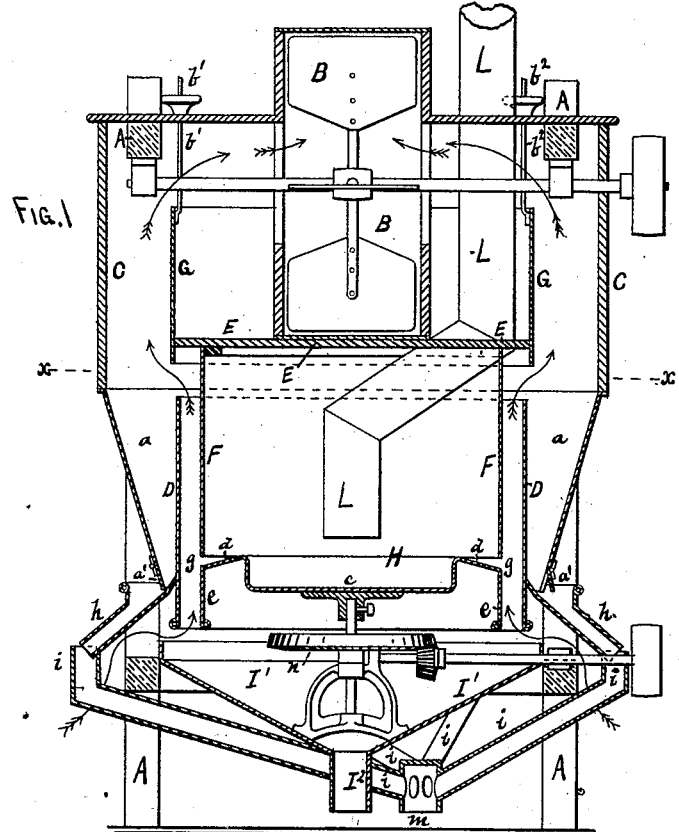
Fig. 1
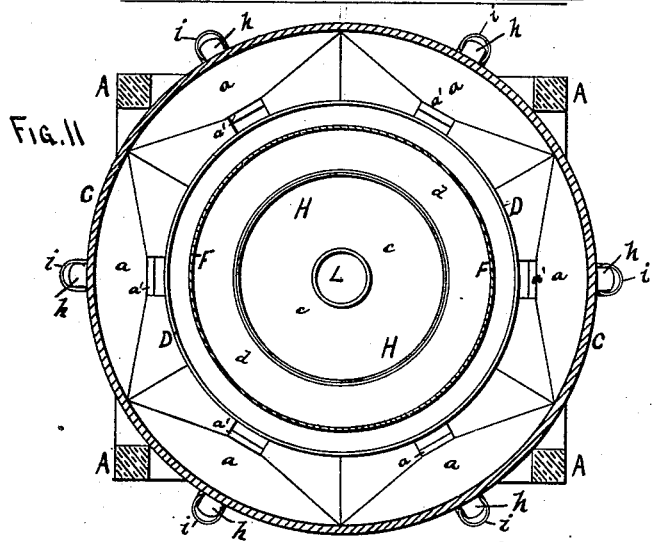
Fig. II
WITNESSES.
Edw. Rotert
J. F. Orcutt
Faustin Prinz
INVENTOR, BY
Louis Feeser & Co.
Attys.

UNITED STATES PATENT OFFICE.

FAUSTIN PRINZ, OF DUNDAS, MINNESOTA, ASSIGNOR OF ONE-HALF TO JOSEPH K. GEHRIG, OF SAME PLACE.

MACHINE FOR SEPARATING FOREIGN MATTER FROM GRAIN, &c.

SPECIFICATION forming part of Letters Patent No. 234,724, dated November 23, 1880.

Application filed May 3, 1880. (No model.)

*To all whom it may concern:*

Be it known that I, FAUSTIN PRINZ, of Dundas, in the county of Rice and State of Minnesota, have made certain Improvements in Machines for Separating Foreign Matter from Grain, &c., of which the following is a specification.

This invention relates to machines for separating grain from foreign matter; and it consists in a shallow dish-shaped plate, adapted to be agitated or revolved in any desired manner, and upon which the grain is fed, the motion of the plate serving to precipitate the particles heavier than the grain to the bottom of the plate and discharge the grain and lighter particles over its edge, where the material is caught by an upward blast of air, which separates the lighter particles from the good grain and carries them upward into an enlarged chamber, while the good grain falls down into conduits and is saved, as hereinafter set forth, the said enlarged chamber again serving to cause the heavier particles in the foreign matter carried off by the air-blast to separate themselves from the dust and very light stuff, thus allowing only the dust and very light chaff to pass through the fan. I attain these results by the mechanism illustrated by the accompanying drawings, in which—

Figure I is a sectional elevation. Fig. II is a plan view, in section, on the line $xx$ of Fig. I.

A is the frame, on the upper part of which a fan, B, is journaled.

C is a circular shell or drum surrounding the fan B and connected, by a number of inclined spouts or pockets, $a$, to another shell or drum, D, smaller than the shell C, and whose upper edge is nearly on a line with the lower edge of the shell C.

E is a circular disk or plate beneath the fan B, and having attached to its under side a third drum or shell, F, smaller than the shell D, and running down inside of it.

The diameter of the disk E is a trifle larger than that of the shell D, and is provided with a sleeve, G, projecting down below it a short distance and upward some distance above it, and made adjustable by screws $b'$ $b^2$, so that the space between its lower edge and the upper edge of the drum D may be varied, as hereinafter explained.

H is a plate or disk having its bosom depressed, as at $c$, and with inclined edges $d$, and arranged to be revolved by the gears $n$, or oscillated, vibrated, or moved in any other manner to cause the grain to be acted upon, as hereinafter explained.

The outer rim of this plate H is inclined downward as at $e$, and is of just the same diameter as the drum F, as shown, the latter coming down almost to its edge, as shown at $g$.

I' is a hopper into which the heavy grain falls, and from which it is conveyed by a spout, $I^2$.

Each of the pockets $a$ will be provided with a small spout, $h$, discharging into spouts $i$, all converging to one common center, $m$.

L is a spout through which the grain is run into the machine and ending just above the disk H.

The grain being fed through the spout L fills the hollow plate H, and the latter being kept in motion is discharged in a thin stream over the edge $d$, at which point it is caught by the upward blast of air, (which enters the machine only at this point, the pockets $a$ being provided with valves $a'$, which prevent its entering through them,) and all particles lighter than the good grain will be carried upward between the drums D and F and into the large chamber between the shell C and sleeve G. At this point the same amount of air occupying a larger space will exert less influence upon the individual particles of the refuse matter carried up by the blast, hence the heavier particles will fall down into the pockets $a$ and be carried off by the spouts $h$ $i$ $m$, while the dust and very fine chaff only will pass through the fan B. Thus not only is the good grain separated from the foreign matter and light grain, but the latter is again separated from the dust and light chaff. In the meantime all matter heavier than the grain, such as stones, pieces of sticks, wire from the wire binders, &c., will, by the motion of the plate H, be precipitated to the bottom of the depression c, from which they may be removed at pleasure.

By these simple arrangements all foreign matter, whether heavier or lighter than the grain, is removed from it, and the dust, chaff, &c., removed from the light wheat and screenings.

The sleeve G being made adjustable enables me to perfectly control the blast to adapt the machine to any kind or condition of grain.

The edge d of the plate H may be made inclined, as shown, or level, as practice may determine to be best.

The sleeve G may be dispensed with and wire-cloth arranged to fill the space between the disk E and top of the drum C, and the blast controlled by slides on the fan-openings, if desired.

The hopper I' may be made of perforated iron, if desired, through which the air may be drawn by the fan B to remove any dust that may still remain in the grain.

What I claim as new is—

1. The combination and arrangement of the plate H, provided with the depressed bosom c and rim d, and adapted to have suitable motion imparted to it, the shells or drums C D F and fan B, substantially as set forth.

2. The combination, with the pockets a, provided with the spouts h, of the spouts i, all converging to one common exit, m, substantially as set forth.

In testimony whereof I have hereunto set my hand in the presence of two subscribing witnesses.

FAUSTIN PRINZ.

Witnesses:
C. N. WOODWARD,
LOUIS FEESER.